United States Patent
Raastad

(10) Patent No.: US 7,405,907 B2
(45) Date of Patent: Jul. 29, 2008

(54) ADJACENT MAGNETORESISTIVE READ HEAD AND METHOD FOR OBTAINING POSITION ERROR SIGNAL

(75) Inventor: Jørn Raastad, Oslo (NO)

(73) Assignee: O-Mass AS, Oslo (NO)

( * ) Notice: Subject to any disclaimer, the term of this patent is extended or adjusted under 35 U.S.C. 154(b) by 217 days.

(21) Appl. No.: 10/910,331

(22) Filed: Aug. 3, 2004

(65) Prior Publication Data

US 2006/0028772 A1    Feb. 9, 2006

(51) Int. Cl.
*G11B 5/127* (2006.01)
(52) U.S. Cl. .................................. 360/315; 324/212
(58) Field of Classification Search .......... 360/314, 360/315, 316, 317, 121, 122
See application file for complete search history.

(56) References Cited

U.S. PATENT DOCUMENTS

| | | | | | |
|---|---|---|---|---|---|
| 3,846,841 | A | * | 11/1974 | Lazzari et al. | 360/121 |
| 3,887,944 | A | * | 6/1975 | Bajorek et al. | 360/316 |
| 4,001,890 | A | * | 1/1977 | Kayser | 360/121 |
| 4,851,944 | A | * | 7/1989 | Mowry | 360/327 |
| 5,027,245 | A | * | 6/1991 | Nagata et al. | 360/121 |
| 5,107,385 | A | * | 4/1992 | Kelley | 360/322 |
| 5,218,498 | A | * | 6/1993 | Jagielinski | 360/316 |
| 5,402,292 | A | * | 3/1995 | Komoda et al. | 360/327.31 |
| 5,493,553 | A | | 2/1996 | Maurice et al. | |
| 5,541,793 | A | * | 7/1996 | Schwarz | 360/121 |
| 5,552,706 | A | * | 9/1996 | Carr | 324/252 |
| 5,582,860 | A | * | 12/1996 | Fontana et al. | 427/130 |
| 5,689,384 | A | | 11/1997 | Albrecht et al. | |
| 5,920,538 | A | | 7/1999 | Il'Yashenko | |
| 6,650,496 | B2 | | 11/2003 | Nozieres et al. | |
| 6,771,567 | B2 | | 8/2004 | Nozieres et al. | |
| 6,970,331 | B1 | * | 11/2005 | He et al. | 360/314 |
| 2004/0080855 | A1 | * | 4/2004 | Tsuchiya et al. | 360/73.04 |

OTHER PUBLICATIONS

"Multi-Tapped Magnetostrictive Heads for Magnetic Tape Tracking Servo," Steele II et al., Paper AE-07 Presented at Joint Intermag/MMM 1998 Conf., San Francisco, California (1998).

* cited by examiner

*Primary Examiner*—Angel A Castro
(74) *Attorney, Agent, or Firm*—Schiff Hardin LLP

(57) ABSTRACT

A read head for reading magnetically stored data in adjacent tracks of a medium has at least two elongate bodies, each having at least one magnetoresistive part. The magnetoresistive parts have sensor portions defined along a length of the elongate bodies, by electrical connections to the magnetoresistive parts. A shield is provided at least on opposite transfer sides of the elongate bodies. The read head is used for calculating a position error signal by calculating a correlation between signals received from the respective sensor portions when the head is positioned over adjacent tracks on the medium, with one of the sensors positioned near a boundary between the tracks. The position error is calculated by determining the correlation between signals from the respective sensor portions.

13 Claims, 4 Drawing Sheets

ADJACENT MAGNETORESISTIVE READ HEAD AND METHOD FOR OBTAINING POSITION ERROR SIGNAL

BACKGROUND OF THE INVENTION

1. Field of the Invention

The present invention relates generally a read head for reading data from magnetic media and in particular to a magnetoresistive read head and a method for obtaining position error information from this read head.

2. Description of the Related Art

Magnetic media, such as magnetic tapes and disks, are recorded with data, such as computer data, music, video, etc. The recorded data are read from the magnetic media by a read head, which passes over the magnetic media to detect changes in the magnetic fields recorded on the magnetic media. Read heads, sometimes referred to as playback heads, may be single read heads or multitrack read heads. In disk recording, most read heads are single read heads, and the disk drive will typically use several single read heads to increase reading speed. In tape drives, most read heads are multitrack read heads, and the drive typically will use one multitrack read head.

As the data density on tapes and disks has increased, the tape- and disk drive typically will employ some type of fine positioning of the head relative to the tape or disk based on the feedback of position information from the media (position error signal—PES). This is typically denoted tracking servo. Several methods exist to generate PES from tape or disk.

U.S. Pat. No. 5,689,384 describes an arrangement for timing-based PES generation wherein the time between the output pulses of the head is measured and the position of the head relative to the tape is determined from this timing. U.S. Pat. No. 5,426,543 describes an arrangement for amplitude-based PES generation wherein the output of the head is amplitude modulated, and wherein the amplitude modulation is a measure of the position of the tape relative to the head. Both of these systems for generating PES have the disadvantages that they a) require magnetic pre-formatting at the media manufacturer, which is a cost concern b) have inaccuracies associated therewith that may cause a tracking error when the track width becomes small.

The data may be recorded on the magnetic media in adjacent tracks simultaneously. A write head for writing such tracks is described in U.S. Pat. No. 6,650,496. Because the data are written on all the adjacent tracks in the track set at the same time, the read head required to read such track set includes multiple read sensors positioned very close to each other or a contiguous sensor element and precise positioning relative to the tracks. U.S. Pat. Nos. 5,920,538 and 6,771,567 are examples of read heads for reading such adjacent tracks. A method and apparatus for preventing crosstalk between sensors positioned to sense data from such consecutively recorded parallel tracks is described in U.S. Pat. No. 5,493,553. Such a cross-talk cancellation technique has serious limitations at very narrow track widths: During the writing of the data, the edge of the track always will be written imperfectly due to the field gradient around the corner of the pole pieces of the head. The write field distribution and the field strength are different at the edge of the head than in the center of the head. Because of this, there is always a "side write" or "erase" band at the track edge, which to a certain degree is a source of noise during playback if the read head is sensing it. In order to have cross-talk between two adjacent readers as described in U.S. Pat. No. 5,493,553 when the tracks are written as described in U.S. Pat. No. 6,650,496, the read heads therefore also must sense the noise from the "side write" or "erase" band, which is a serious disadvantage when reading narrow tracks. Such erase bands are described, for instance, in the article "Tape Erase Bands Measured by MFM Compared to MR Head Cross Erase Band Responses," T. Pan et. al., IEEE Trans. Magnet., Vol. 32, No. 5, pp. 3407-3409 (1996).

Read heads based on the magneto-resistive (MR) effect are well known technology for reading recorded data and servo information on a magnetic media. A large number of patents, articles and books have been published on the subject, and a number of products are based on this technology. A possible solution for reading data from adjacent tracks is to use a MR head having a single bias current to bias two or more MR sensors at the same time ("comb head") as described in the article "Multi-Tapped Magnetoresistive Heads for Magnetic Tape Tracking Servo," presented at Joint Intermag/MMM 1998 Conf., San Francisco, Calif. 1998 (Paper AE-07) and published in revised form in IEEE Trans. Magnet., Vol. 34, No. 4, pp. 1904-1906 (7/1998). Using this configuration it is possible to sense, as described in the article, two track edges at the same time differentially to obtain position information from a simple servo pattern written on the tape. It is clear that the same head also can be used to sense data information from two or more adjacent tracks, but the read sensors also would sense the noise from the erase bands between the tracks, which is problematic for the data decoding, in particular modern detection methods like Partial Response Maximum Likelihood (PRML).

SUMMARY OF THE INVENTION

An object of the present invention is to provide a read head for detecting data and servo information on adjacent tracks of recorded magnetic media as well as a method for determining position error signal from such a read head.

This object is achieved in accordance with the invention by a read head wherein the read sensors are disposed adjacent one another in more than one plane, with shielding therebetween. Various embodiments of the invention are provided including an embodiment where the adjacent magnetoresistive read heads exhibit a cross-track pitch that is about equal to half the track pitch, and at least one sensor is centered on the boundary between two tracks to detect information that is used to calculate position error signal. In a further embodiment, a common permanent magnet is provided between the magnetoresistive read heads. Another embodiment has a single elongated magnetoresistive read head with narrow tapping points to read adjacent tracks, with the conductivity of the electrical connection being sufficiently high that the sensitivity of the undelaying sensor is low.

The inventive method for obtaining position error signal is based on a head as described above, with the center of at least one magnetoresistive sensor being positioned near the boundary between two tracks, and the calculation of the position being based on the cross-correlation between a center sensor and one or more adjacent sensors. Various embodiments of the method are provided, including a method to calculate the cross-correlation when signals originate from more than one plane, also in the presence of timing jitter, for example caused by tape speed variations.

DETAILED DESCRIPTION OF THE PREFERRED EMBODIMENTS

Figure 1:
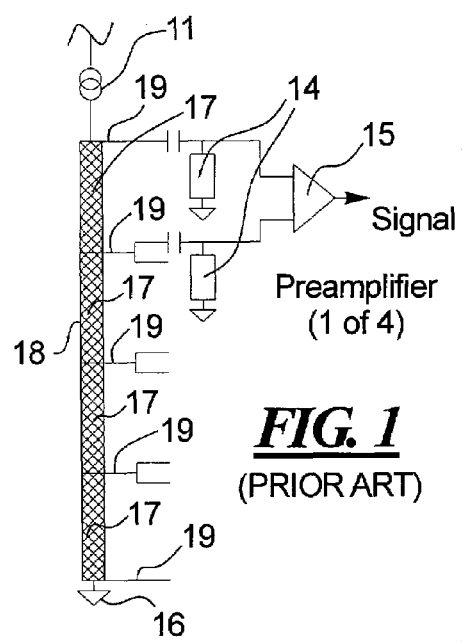
FIG. 1 shows a single plane, single magnetoresistive stripe tapped head for use with amplitude modulation tracking servo known from the prior art.
Figure 2:
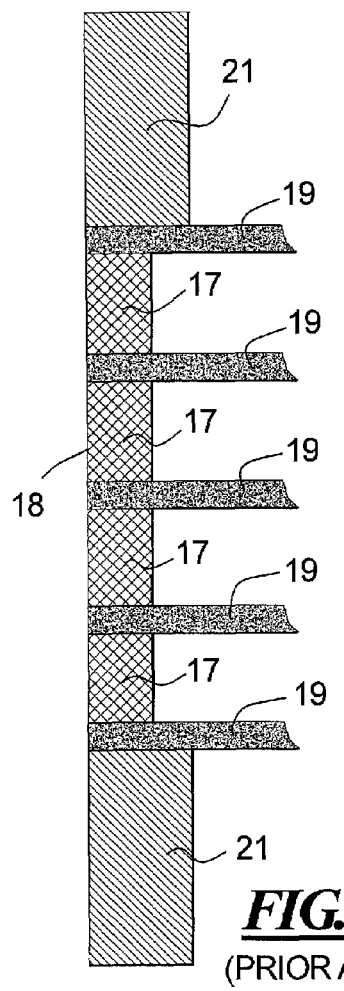
FIG. 2 is a side view of the head of FIG. 1.
Figure 3:
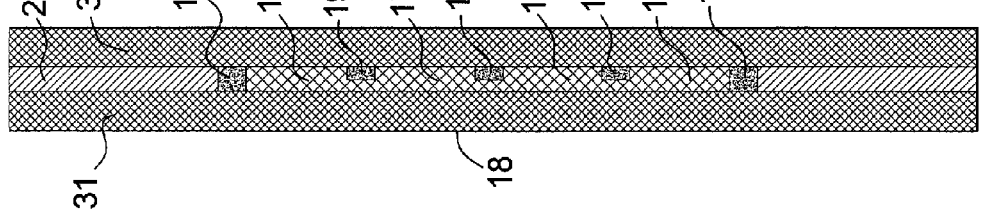
FIG. 3 is a front view of the head of FIG. 1, seen from the tape-bearing surface.

Referring first to FIG. 1 and FIG. 2 (prior art), adjacent tracks on a recording media may be read by the magnetoresistive read head, as shown. One magnetoresistive (MR) sensor 18 is biased by a single bias current source 11. Because the resistance in the resistors 14 as well as the input impedance of the differential amplifiers 15 is high compared to the resistance of the MR stripe, most of the current flows through the sensor to ground 16. Several connectors 19 are connected to the MR stripe 18. Each connector represents a voltage tap point where the portion of the sensor 17 between two voltage taps 19 becomes an individual MR sensor. The magnetic field seen by such portion of the MR sensor can be sensed differentially between two voltage taps 19 by a differential amplifier 15. Permanent magnets 21 are provided at the ends of MR stripe 18 in order to stabilize any domain activity in the MR sensor. FIG. 3 shows the same as FIG. 2, but seen from the front of the head (tape bearing surface—TBS). When seen from this side the shields 31 can be seen as well.

Figure 4:
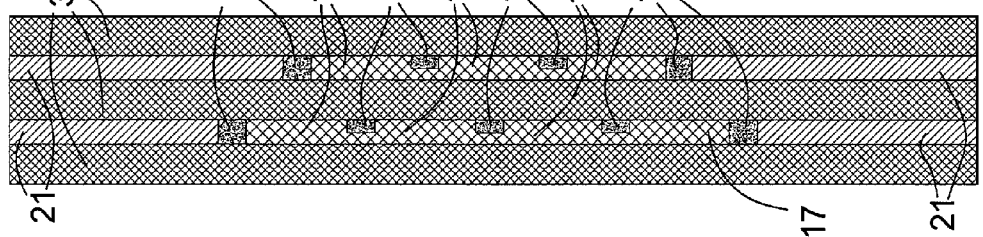
FIG. 4 is a dual plane tapped head, with a single magnetoresistive stripe per plane forming a combined data and servo read head of the invention.

In FIG. 4 is shown a double row approach in accordance with the invention that avoids certain problems associated with the known heads shown in FIGS. 1-3. This approach can be used, for example, for reading data and decoding tracking information at the same time. The MR sensors 17 are offset by a half track width between the two rows, such that the MR sensors on one row typically will be centered on the read track to read data, while the MR sensors that are offset by half a track width on the other row typically will be centered on the boundary between the tracks to read position error information. This arrangement has the advantage over the prior art shown in FIGS. 1-3 of allowing for some degree of independent scaling of the head pitch and the read track width, which is important to maximize the signal-to-noise ratio for reading data while at the same time obtaining position error information with the best possible accuracy.

Figure 5:
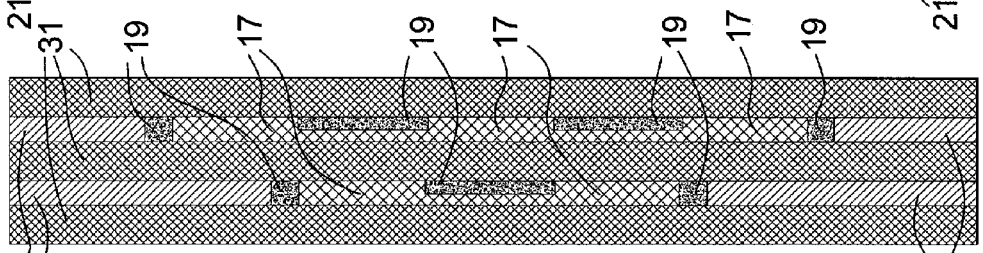
FIG. 5 is a dual plane tapped head, with a single magnetoresistive stripe per plane forming a data read head, or for decoding servo information with algorithms, in accordance with the invention.

FIG. 5 shows another embodiment for implementing a two-row approach in accordance with the invention. This approach is advantageous over the prior art when reading data at very low track pitch when no servo position information is required. Generally, the magnetic sensitivity is lower underneath the connectors 19 than elsewhere in the MR stripe 18. Also, it is generally desirable to have a read width as close to the track width as possible, so as to maximize the signal-to-noise ratio of the reading. Furthermore, there are certain practical limitations as to how narrow a connector 18 to the MR stripe can be made. Therefore, when the read track width becomes comparable to the minimum practical connector dimensions, a penalty in signal to noise ratio has to be paid when detection is done as described in FIGS. 1-3.

By implementing the head as shown in FIG. 5 this penalty is avoided, and the read track width and track pitch can be adjusted independently.

Figure 7:
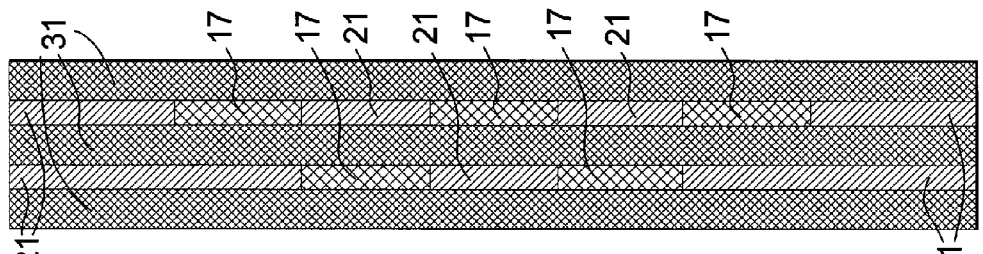
FIG. 7 is the same as FIG. 6, but with a permanent magnet serving as the electrical connection.
Figure 6:
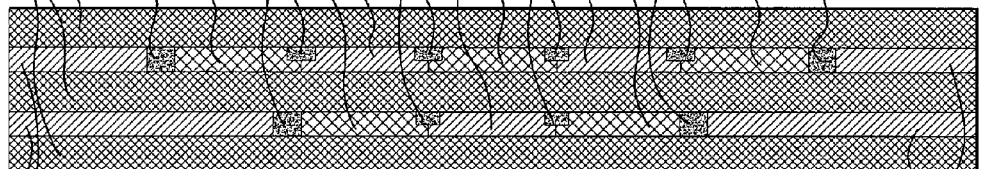
FIG. 6 is a dual plane head having multiple magnetoresistive sensors per plane with permanent magnet stabilization between sensors, forming a data read head or for decoding servo information with in accordance with the invention.

FIG. 6 shows an alternative approach, wherein permanent magnets 21 are added between the individual MR sensors. This is to ensure sufficient stability of each individual MR element. In The permanent magnets can be isolators or isolated from the MR sensor 18, in which case separate connectors 19 carry the signal, (FIG. 6) or each can be a conductor electrically connected to the MR sensor 18 (FIG. 7), in which case it will serve as both a permanent magnet and a connector 19. In such a case it can be beneficial to use a common return signal (ground) for more than one individual MR sensor.

Figure 8:
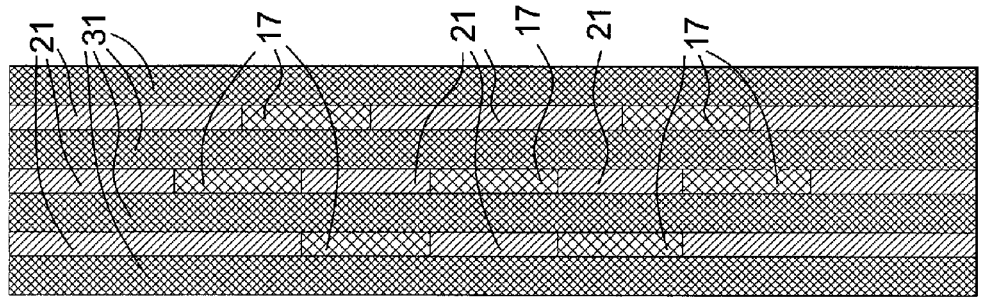
FIG. 8 is a triple plane data and servo read head with multiple magnetoresistive sensors per plane and with permanent magnet stabilization between the sensors, in accordance with the invention.

FIG. 8 shows another embodiment where three rows are implemented in order to combine several of the features described above. For example, the concept of reading tracking information and data information at the same time described in FIG. 4 can be implemented at very narrow tracks using permanent magnets as connectors as described in FIG. 6. This is just one of many possible combinations.

If the number of parallel channels is high, the magnetoresistive element 18 can become fairly long and as a consequence the voltage over the length of the magneto-resistive element can get relatively high. This is particularly so since the average resistance can be 60 ohms for each tapping point 19 and a sense current of 8 mA can be used. A voltage drop of 7 to 8 volts across the magneto-resistive element 18 may be expected for a 16 channel head if a single MR stripe is used.

Also, when the distance between two permanent magnets 21 becomes too large, the stabilization effect is questionable. It is therefore desirable to keep the maximum distance below, for example, 40 μm.

Figure 9:
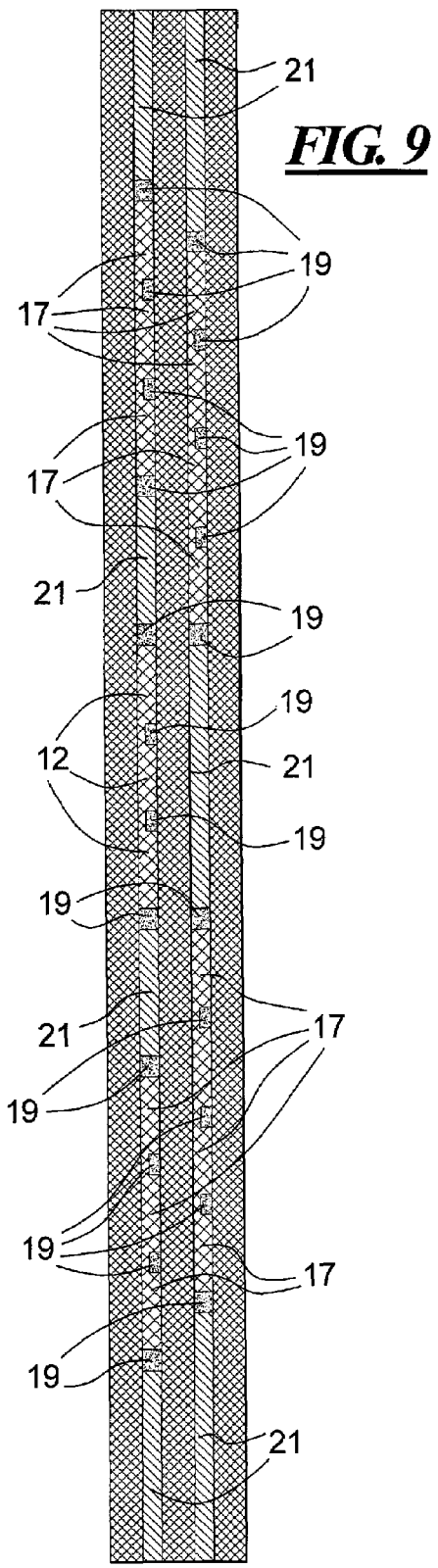
FIG. 9 is a dual plane tapped data and servo read head with multi magnetoresistive stripe per plane with permanent magnets in-between for stabilization, in accordance with the invention.

As a consequence, it is sometimes desirable to use more than one MR sensor stripe to detect the entire track set. One embodiment to achieve this is shown in FIG. 9. In this embodiment the first row has three MR stripes 18 separated by permanent magnets 21. Each MR stripe is divided into three individual MR sensors by the connectors 19, as previously described. The second row has two MR stripes 18 separated by one or two permanent magnets 21. Each MR stripe is divided into four individual MR sensors. Each row has permanent magnets 21 at the end of each row. In this particular embodiment some MR sensors are offset by approximately one half-track pitch in order to facilitate extraction of position error information. Also, the dual row arrangement allows for permanent magnets inside the trackset since the MR sensors on the two or more rows altogether cover the full width of the trackset.

Figure 10:
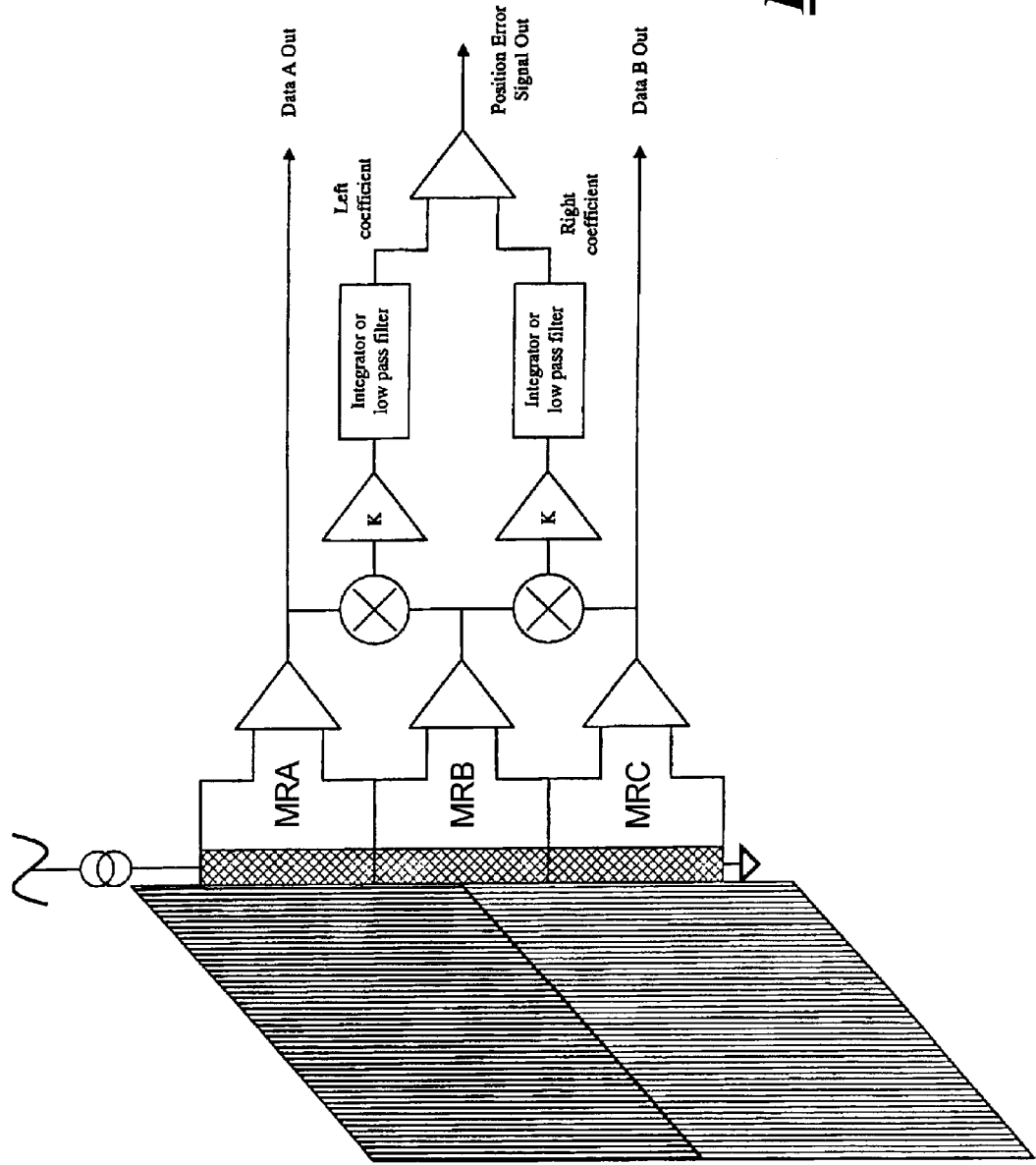
FIG. 10 illustrates a method to calculate position error signal from adjacent sensors on two adjacent tracks in accordance with the invention.

FIG. 10 illustrates a method for obtaining information of the relative position between parallel magnetic information tracks and the magnetic head. At least two tracks and three sections of the MR sensor are required. The two tracks are filled with random or semi-random data such that the correlation between the two tracks is low when measured at approximately the same downtrack position. The middle sensor MR B is positioned at the boundary between the two tracks, and a signal is read from all three sensors MR-A MR-B and MR-C. A simplified correlation calculation is shown that indicates the degree of similarity between the center signal and the two immediately adjacent signals. Since the center sensor is positioned close to the boundary of the two tracks, the right and left coefficient will typically be around 50% each, and the calculated difference will be around 0, indicating an on-track condition. In an off-track situation the center of the middle sensor will no longer be at the boundary between the two tracks, but rather somewhere inside one of the tracks. The crosstalk coefficients and eventually the position error signal will be updated accordingly to indicate the off track situation, and the servo loop that controls the head position can take action to correct the error condition.

The method is distinguished from the previously cited prior art "Multi-Tapped Magnetoresistive Heads for Magnetic Tape Tracking Servo" (John H. Steel II et.al.) by calculating correlation between signals rather than recording peak amplitudes, thereby the system is independent of isolated tracks specifically written for the purpose of tracking servo, which enables the system to use solely the data tracks also for position information, without the added cost, overhead and position tolerances of dedicated servo tracks. The method is distinguished over U.S. Pat. No. 5,493,553 by a) having the primary purpose of obtaining position information, not correcting cross-talk; b) positioning the center of (some of) the sensors at the boundary between the tracks rather than at the center of the tracks; and c) calculating a more accurate crosstalk coefficient by doing a full product between the two heads rather than multiplying by ±1. Altogether this ensures a much higher accuracy of the crosstalk coefficient, which again provides a very accurate position measure that can be used to position the head relative to the tape.

Figure 11:
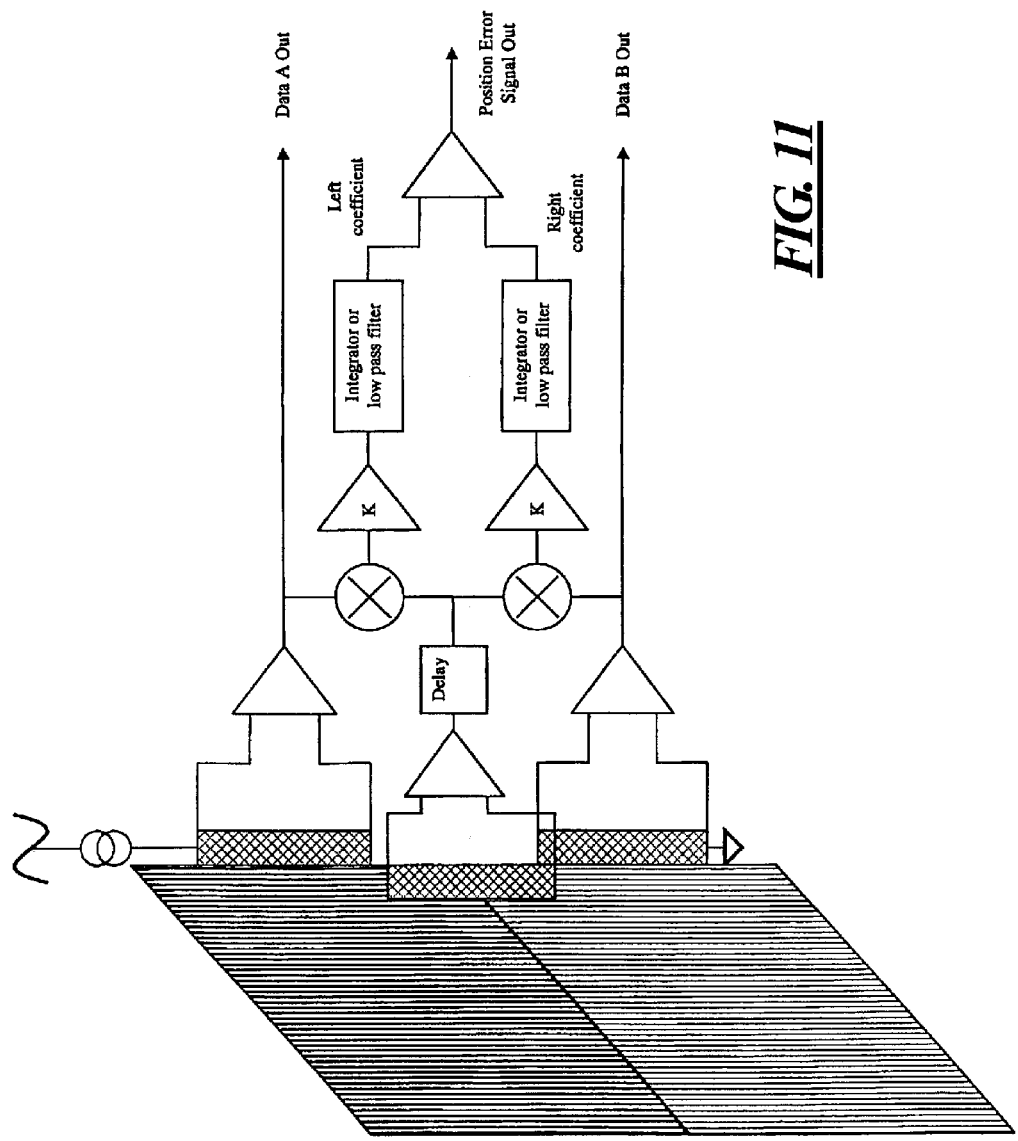
FIG. 11 illustrates a method to calculate position error signal from two adjacent tracks in accordance with the invention when there is a down-track separation between adjacent read sensors.

FIG. 11 shows another embodiment of the implementation of the method shown in FIG. 10. In this case the MR sensors used to sense is split between two (or more) different planes in the downtrack direction (as indicated in FIGS. 4-9), and there is a time difference between the signals from the heads in the two or more planes. There are a number of advantages of such a layout of the heads, mostly related to manufacturing and signal-to-noise ratio of the readout signal. However, one disadvantage is that the signals no longer originate from adjacent read channels that can be inspected directly for correlation to compute position error signal or crosstalk. FIG. 11 illustrates a method to realign the signals in time electronically by introducing a time delay into one or more of the signals. The time delay can be fixed or variable. A variable time delay can account for possible shifts in the velocity of the recording medium. When such variable time delay is to be expected, for example caused by unintended variability of the speed of the medium, computations for several time delays can be done electronically in parallel and while keeping track of where the cross correlation is maximized. This maximum cross correlation represents the time shift that gives the signals the best alignment in time.

Although other modifications and changes may be suggested by those skilled in the art, it is the intention of the inventor to embody within the patent warranted hereon all changes and modifications as reasonably and properly come within the scope of his contribution to the art.

I claim:

1. A read head for reading magnetically stored data in adjacent tracks of a medium, comprising:
at least two elongate bodies each having at least one magnetoresistive part, the respective magnetoresistive parts of the at least two elongate bodies being disposed in different planes and each magnetoresistive part having a sensor portion defined along a length of said elongate bodies and having a sensor surface facing said medium, the respective sensor portions being defined by electrical connections to said magnetoresistive parts;
said tracks of said medium having a width, and the respective sensor portions being equal to or narrower than said width; and, in a direction transverse to said tracks, the respective sensor portions having a center-to-center pitch equal to approximately one-half of said width; and
respective shields disposed on opposite transverse sides of each of said elongate bodies, each of said shields having a shield surface facing said medium, with the respective shield surfaces alternating with the respective sensor surfaces.

2. A read head as claimed in claim 1, where said tracks of said medium have a center, and wherein at least some of said sensor portions are disposed near said center.

3. A read head as claimed in claim 1, wherein said sensor portions have conductivity, and wherein said electrical connections have a substantially higher conductivity than said sensor portions for reducing current flowing through said sensor portions beneath said electrical connections for reducing sensitivity of said sensor portions beneath said electrical connections.

4. A read head as claimed in claim 1, comprising respective permanent magnet sections disposed between said sensor portions.

5. A read head as claimed in claim 1, wherein said magnetoresistive parts are arranged in pairs, with each pair sharing a common permanent magnet section.

6. A read head for reading magnetically stored data in adjacent tracks of a medium, comprising:
at least two elongate bodies each having at least one magnetoresistive part, the respective magnetoresistive parts of the at least two elongate bodies being disposed in different planes and each magnetoresistive part having a sensor portion defined along a length of said elongate bodies and having a sensor surface facing said medium, the respective sensor portions being defined by electrical connections to said magnetoresistive parts;
said magnetoresistive parts being arranged in pairs, with each pair sharing a common permanent magnet section, and said tracks of said medium having a width, and said permanent magnet section having a width approximately equal to said width of said tracks; and
respective shields disposed on opposite transverse sides of each of said elongate bodies, each of said shields having a shield surface facing said medium, with the respective shield surfaces alternating with the respective sensor surfaces.

7. A read head for reading magnetically stored data in adjacent tracks of a medium, comprising
at least two elongate bodies each having at least one magnetoresistive part, the respective magnetoresistive parts of the at least two elongate bodies being disposed in different planes and each magnetoresistive part having a sensor portion defined along a length of said elongate bodies and having a sensor surface facing said medium, the respective sensor portions being defined by electrical connections to said magnetoresistive parts;

said magnetoresistive parts being arranged in pairs, with each pair sharing a common permanent magnet section, and said tracks of said medium having a width, and said permanent magnet section having a width substantially narrower than said width of said tracks; and respective shields disposed on opposite transverse sides of each of said elongate bodies, each of said shields having a shield surface facing said medium, with the respective shield surfaces alternating with the respective sensor surfaces.

8. A read head for reading magnetically stored data in adjacent tracks of a medium, comprising at least two elongate bodies each having at least one magnetoresistive part, the respective magnetoresistive parts of the at least two elongate bodies being disposed in different planes and each magnetoresistive part having a sensor portion defined along a length of said elongate bodies and having a sensor surface facing said medium, the respective sensor portions being defined by electrical connections to said magnetoresistive parts; said magnetoresistive parts being arranged in pairs, with each pair sharing a common permanent magnet section, and said permanent magnet section being composed of a conductive material serving as an electrical connection; and respective shields disposed on opposite transverse sides of each of said elongate bodies, each of said shields having a shield surface facing said medium, with the respective shield surfaces alternating with the respective sensor surfaces.

9. A read head for reading magnetically stored data in adjacent tracks of a medium, said tracks having a width, said read head comprising:

at least two elongate bodies each having at least one magnetoresistive part, each magnetoresistive part having a sensor portion defined along a length of said elongate bodies, the respective sensor portions being defined by electrical connections to said magnetoresistive parts;

the respective sensor portions being equal to or narrower than said width of said tracks, and the respective sensor portions having a center-to-center pitch equal to approximately one-half of said width; and a shield disposed at least on opposite transverse sides of said elongate bodies.

10. A read head for reading magnetically stored data in adjacent tracks of a medium, said tracks having a width, said read head comprising:

at least two elongate bodies each having at least one magnetoresistive part, each magnetoresistive part having a sensor portion defined along a length of said elongate bodies, the respective sensor portions being defined by electrical connections to said magnetoresistive parts;

said magnetoresistive parts being arranged in pairs, with each pair sharing a common permanent magnet section, and each permanent magnet section having a width approximately equal to said width of said tracks; and a shield disposed at least on opposite transverse sides of said elongate bodies.

11. A read head as claimed in claim 10, wherein said tracks of said medium have a width, and wherein said permanent magnet section has a width substantially narrower than said width of said tracks.

12. A read head for reading magnetically stored data in adjacent tracks of a medium, said tracks having a width, said read head comprising:

at least two elongate bodies each having at least one magnetoresistive part, each magnetoresistive part having a sensor portion defined along a length of said elongate bodies, the respective sensor portions being defined by electrical connections to said magnetoresistive parts;

said magnetoresistive parts being arranged in pairs, with each pair sharing a common permanent magnet section, and each permanent magnet section having a width substantially narrower than said width of said tracks; and a shield disposed at least on opposite transverse sides of said elongate bodies.

13. A read head as claimed in claim 12 wherein said permanent magnet section is composed of a conductive material serving as an electrical connection.

\* \* \* \* \*